United States Patent
Gibbons et al.

(10) Patent No.: US 6,548,201 B1
(45) Date of Patent: Apr. 15, 2003

(54) ZINC/AIR CELL

(75) Inventors: Daniel Gibbons, Southbury, CT (US);
Peter R. Moses, Windham, NH (US);
Guang Wei, Southborough, MA (US);
David Pappas, Waltham, MA (US);
Rokeya Huq, Norwood, MA (US)

(73) Assignee: The Gillette Company, Boston, MA (US)

( * ) Notice: Subject to any disclaimer, the term of this patent is extended or adjusted under 35 U.S.C. 154(b) by 168 days.

(21) Appl. No.: 09/638,993

(22) Filed: Aug. 15, 2000

Related U.S. Application Data

(63) Continuation-in-part of application No. 09/459,511, filed on Dec. 13, 1999, now Pat. No. 6,447,947.

(51) Int. Cl.$^7$ .......................... H01M 4/00; H01M 4/42; H01M 2/04
(52) U.S. Cl. .......................... 429/27; 29/623.1; 429/57; 429/163; 429/176; 429/229
(58) Field of Search ................ 429/229, 209, 429/230, 245, 59, 57, 176, 166, 163, 27; 29/623.1

(56) References Cited

U.S. PATENT DOCUMENTS

| | | |
|---|---|---|
| 5,168,018 A | 12/1992 | Yoshizawa |
| 5,279,905 A | 1/1994 | Mansfield |
| 5,376,480 A | 12/1994 | Shinoda |
| 5,464,709 A | 11/1995 | Getz |
| 5,721,065 A * | 2/1998 | Collien et al. ................ 429/29 |
| 6,087,030 A | 7/2000 | Collien |
| 6,447,947 B1 * | 9/2002 | Huq et al. ................ 429/176 |

FOREIGN PATENT DOCUMENTS

EP 0457354 A1 11/1991

OTHER PUBLICATIONS

Linden. Handbook of Batteries, 2nd ed. p. 12.2 1995 (no month).*

* cited by examiner

*Primary Examiner*—Carol Chaney
*Assistant Examiner*—Tracy Dove
(74) *Attorney, Agent, or Firm*—Barry D. Josephs; Paul I. Douglas

(57) ABSTRACT

A process for heat treating the metal sheeting forming the anode casing of a zinc/air depolarized cell before anode material comprising zinc is inserted into the anode casing. The anode casing has a layer of copper on its inside surface. The process comprises heat treating the metal sheeting forming the anode casing by passing a gas at a temperature between about 200° C. and 700° C., preferably between about 300° C. and 600° C. in contact therewith to form a heat treated sheeting and then cooling said heat treated sheeting to ambient temperature. The anode casing is stored away from atmospheric air until anode active material is inserted therein during cell assembly. The heat treating process significantly reduces gassing during cell discharge and storage. The cell's capacity and performance is improved when the cell's anode comprises particulate zinc (or zinc alloy) plated with indium, preferably between about 200 and 600 ppm indium. The need to add mercury to the anode material is reduced and can be eliminated.

30 Claims, 2 Drawing Sheets

ZINC/AIR CELL

CROSS REFERENCE TO RELATED APPLICATIONS

This application is a continuation in part of application Ser. No. 09/459,511, filed Dec. 13, 1999 now U.S. Pat. No. 6,447,947, issued Sep. 10, 2002.

FIELD OF THE INVENTION

The invention relates to a metal/air cell having an anode comprising zinc and an air cathode. The invention relates to employing an anode comprising zinc particles plated with indium and heat treating a copper surface forming the inside surface of the cell's anode casing, such as by passing a heated gas in contact therewith.

BACKGROUND

Zinc/air cells are typically in the form of button cells which have particular utility as batteries for electronic hearing aids including programmable type hearing aids. Such miniature cells typically have a disk-like cylindrical shape of diameter between about 4 and 12 mm and a height between about 2 and 6 mm. Zinc air cells can also be produced in somewhat larger sizes having a cylindrical casing of size comparable to conventional AAAA, AAA, AA, C and D size $Zn/MnO_2$ alkaline cells and even larger sizes.

The miniature zinc/air button cell typically comprises an anode casing (anode cup), and a cathode casing (cathode cup). The anode casing and cathode casing each can have a closed end and an open end. An electrical insulating material can be placed around the outside surface of the anode casing. After the necessary materials are inserted into the anode and cathode casings, the open end of the anode casing is typically inserted into the open end of the cathode casing and the cell sealed by crimping. The anode casing can be filled with a mixture comprising particulate zinc. The zinc mixture contains mercury (typically about 3 percent by weight of the anode) and also a gelling agent and becomes gelled when electrolyte is added to the mixture. The electrolyte is usually an aqueous solution of potassium hydroxide, however, other aqueous alkaline electrolytes can be used. The cathode casing contains an air diffuser (air filter) which lines the inside surface of the cathode casing's closed end. The air diffuser can be selected from a variety of air permeable materials including paper and porous polymeric material. The air diffuser is placed adjacent to air holes in the surface of the closed end of the cathode casing. Catalytic material typically comprising a mixture of particulate manganese dioxide, carbon and hydrophobic binder can be inserted into the cathode casing over the air diffuser on the side of the air diffuser not contacting the air holes. An ion permeable separator is typically applied over the catalytic material so that it faces the open end of the cathode casing.

The cathode casing can typically be of nickel plated steel or nickel plated stainless steel, for example, with the nickel plate forming the cathode casing's outside surface and stainless steel forming the casing's inside surface. The anode casing can also be of nickel plated stainless steel, typically with the nickel plate forming the casing's outside surface. The anode casing can be of a triclad material composed of stainless steel having an outer layer of nickel and an inner layer of copper. In such embodiment the nickel layer typically forms the anode casing's outside surface and the copper layer forms the anode casing's inside surface. The copper inside layer is desirable in that it provides a highly conductive pathway between the zinc particles and the cell's negative terminal at the closed end of the anode casing. An insulator ring of a durable, polymeric material can be inserted over the outside surface of the anode casing. The insulator ring is typically of high density polyethylene, polypropylene or nylon which resists flow (cold flow) when squeezed.

After the anode casing is filled with the zinc mixture and after the air diffuser, catalyst, and ion permeable separator is placed into the cathode casing, the open end of the anode casing can be inserted into the open end of the cathode casing. The peripheral edge of the cathode casing can then be crimped over the peripheral edge of the anode casing to form a tightly sealed cell. The insulator ring around the anode casing prevents electrical contact between the anode and cathode cups. A removable tab is placed over the air holes on the surface of the cathode casing. Before use, the tab is removed to expose the air holes allowing air to ingress and activate the cell. A portion of the closed end of the anode casing can function as the cell's negative terminal and a portion of the closed end of the cathode casing can function as the cell's positive terminal.

Typically, mercury is added in amount of at least one percent by weight, for example, about 3 percent by weight of the zinc in the anode mix. The mercury is added to the anode mix to reduce the hydrogen gassing which can occur as a side reaction in the zinc/air cell during discharge and when the cell is placed in storage before or after discharge. The gassing, if excessive, can reduce the cell capacity and increase the chance of electrolyte leakage. Such leakage can damage or destroy the hearing aid or other electronic component being powered. The mercury also improves electrical conductivity between the zinc particles. Many regions around the world now greatly restrict the use of mercury in electrochemical cells because of environmental concerns.

Although mercury can now be eliminated from conventional $zinc/MnO_2$ alkaline cells by addition of various gassing inhibitors, to the anode mix, the elimination of mercury from zinc/air cells has proved to pose a far more difficult problem. This is because the zinc/air cells are provided with air holes at the end of the cathode casing, and zinc/air cells are typically much smaller cells. The air holes can provide a path for electrolyte to escape if there is even a moderate amount of gassing. Additionally, if conventional gassing inhibitors are added to the zinc/air cell anode mix instead of mercury, they either significantly reduce the anode conductivity or have to be added in quantity, thereby significantly reducing the cell's capacity (mAmp-hrs).

U.S. Pat. No. 3,897,265 discloses a representative zinc/air button cell construction with an anode casing inserted into the cathode casing. There is disclosed an insulator between the anode and cathode casings. The anode comprises zinc amalgamated with mercury. The cell includes an assembly comprising an air diffuser, cathode catalyst, and separator at the closed end of the cathode casing facing air holes in the surface of the cathode casing.

U.S. Pat. No. 5,279,905 discloses a miniature zinc/air cell wherein little or no mercury has been added to the anode mix. Instead, the inner layer of the anode casing has been coated with a layer of indium. The disclosed anode casing can be a triclad material composed of stainless steel plated on the outside surface with nickel and on the inside surface with copper. The copper layer is at least 1 microinch ($25.4 \times 10^{-6}$ mm). The reference discloses coating the copper layer on the anode casing's inside surface with a layer of indium. The indium layer is disclosed as being between about 1 microinch and 5 microinches (25.4×10$^{-6}$ mm and 127×10$^{-6}$ mm).

It is thus desired to produce a zinc/air cell without added mercury.

It is desired to eliminate the need to add mercury to the zinc/air cell without increasing gassing within the cell, yet while obtaining good cell performance.

SUMMARY OF THE INVENTION

An aspect of the invention is directed to a zinc/air depolarized cell employing as anode active material zinc particles wherein the zinc particle surface has been plated with indium. The zinc average particle size is desirably between about 30 and 350 micron (30×10$^{-6}$ meter and 350×10$^{-6}$ meter). The zinc particles can be pure zinc or in the form of particulate zinc alloyed with a small amount, for example, between about 100 and 2000 ppm (based on pure zinc) of an alloy material. Suitable alloy materials for particulate zinc, for example, can be alloy materials of indium or indium and lead, or indium, lead and aluminum. Another desirable alloy material of indium and bismuth can also be used. These particulate zinc alloys desirably contains less than about 1000 ppm, preferably between about 100 and 1000 ppm of any one alloy metal therein and therefore, such zinc alloys are essentially comprised of pure zinc. That is, the zinc alloys have the electrochemical capacity essentially of pure zinc. Thus, the term "zinc" shall be understood to include such materials. The surface of such particulate zinc alloy can be plated with between about 50 and 1000 ppm indium in order to improve cell capacity and performance. The zinc particles are desirably plated with between about 200 and 600 ppm indium based on pure zinc. A preferred zinc alloy which can be plated with indium is particulate zinc of average particle size between about 200 and 250 micron alloyed with 500 ppm indium, 500 ppm lead, and 50 ppm aluminum. Desirably the particulate zinc is plated with between about 200 and 600 ppm indium, for example, between about 300 and 500 ppm indium. It has been determined that when particulate zinc, which has been plated with indium, is used as anode material in a zinc/air cell, the cell's performance is improved. In particular the use of the indium plated zinc as anode active material improves conductivity between the zinc particles. The plated zinc thus improves capacity and cell performance, for example, reduces cell gassing, and thus reduces the need to add mercury to the anode. In a preferred aspect, a zinc/air cell is formed with an anode which is preplated with indium and also has an anode casing which is heat treated in accordance with the heat treating process of the invention. In such case there can also be no added mercury in the anode, that is less than 50 ppm mercury, preferably less than 20 ppm mercury per total cell weight.

In a preferred process the zinc particles can be blended with indium acetate powder until a homogeneous mixture is obtained. An aqueous solution of acetic acid (2 wt. % acetic acid in water) can then be added to the mixture of zinc particles and indium acetate powder and the mixture additionally blended to achieve a homogeneous blend. During the latter blending indium acetate dissolves in the acetic acid and forms indium ions. The indium ions undergo a replacement reaction with a small amount of zinc thereby causing the indium ions to become reduced to indium metal which plates onto the remaining zinc particles. Desirably between about 300 and 500 ppm indium is plated onto the surface of the zinc particles.

Alternatively, the zinc particles can first be blended with an aqueous solution of acetic acid (2 wt. % acetic acid in water) for about 10 minutes or until a homogeneous mixture is obtained. Indium acetate powder can then be added to the mixture and additionally blended to achieve a homogeneous mixture. During the latter blending indium acetate dissolves in the acetic acid forming indium ions. The indium ions undergo a replacement reaction with a small amount of zinc thereby causing the indium ions to form indium metal which plates onto the remaining zinc particles. Desirably between about 300 and 500 ppm indium is plated onto the surface of the zinc particles.

Another aspect of the invention is directed to heat treating the metal sheeting forming the anode casing of a metal/air depolarized cell, desirably the anode casing of a zinc/air cell. The invention can be specifically directed to heat treating the anode casing of a miniature zinc/air button cell useful as a power source for hearing aids. The process of the invention is directed to heat treating the metal sheeting, preferably after it is stamped into shape but before anode active material is inserted therein. The heat treatment of the anode casing before active material is inserted into the casing can be referenced herein as post heat treatment. It will be appreciated that the heat treatment can be applied directly to the metal sheeting from which the anode casing is formed, thus making it unnecessary to heat treat the anode casing after the sheeting has been stamped into the shape of an anode casing. The metal sheeting from which the anode casing is formed could also be heat treated both before and after stamping. The anode casing has a copper layer lining its inside surface. The anode casing is preferably of a triclad material comprising stainless steel having an outside layer of nickel and an exposed inside layer of copper. The heat treatment process of the invention reduces the amount of surface oxides on the copper layer. The zinc is inserted into the anode casing so that it contacts the heat treated copper layer.

The heat treating preferably involves (a) heat treating said anode casing such as with a gas passed in contact therewith at a temperature between about 200° C. and 700° C., preferably a temperature between about 300° C. and 600° C., to form a heat treated anode casing, and (b) cooling the heat treated anode casing to ambient temperature. The heat treated anode casing is then preferably stored away from atmospheric air, for example, in a vacuum sealed bag, until it is ready to be filled with anode active material during cell assembly. Preferably, the anode casing is heat treated in a quartz furnace by passing a treating gas therethrough in contact with the casing. The anode casing can be placed in a quartz tube within the furnace and the treating gas passed through the furnace so that it contacts the anode casing. The treating gas is preferably a reducing gas, for example, a gas comprising hydrogen. A preferred reducing gas comprises about 5 wt. % hydrogen and 95 wt. % inert or substantially inert gas such as argon or nitrogen.

The heat treating of the anode casing can desirably be carried out in essentially two steps: (a.1) an initial heating period (ramp period) wherein the furnace temperature and consequently the temperature of the treating gas passing therethrough in contact with the anode casing is gradually increased from an initial temperature to a desired elevated (soak) temperature, and (a.2) a primary heating period wherein the treating gas temperature in contact with the anode casing is maintained at said elevated (soak) temperature for a set period time (soak period). The initial temperature of the gas in contact with the anode casing can be at about room temperature (20° C.) or lower, but also can be higher, for example, a temperature between about 20° C. and 30° C. The soak temperature is desirably a temperature between about 300° C. and 700° C., preferably a temperature between about 300° C. and 600° C., more preferably a temperature between about 400° C. and 600° C. The soak temperature is preferably maintained at a constant temperature within the above stated soak temperature range, but can also be a variable temperature within the above stated soak temperature ranges.

The treating gas flow in contact with the anode casing is maintained throughout the primary heating and soak period. Once the soak temperature is reached, the anode casing is desirably exposed to the flowing treatment gas at soak temperature for a relatively short period of between about 5 and 25 minutes, preferably for about 15 minutes. The treating gas can be passed through the furnace and in contact with anode casing with the gas in either laminar or turbulent flow. Thus, the rate of gas flow is not critical and a slow rate of gas flow of between about 8 and 10 cubic centimeters per minute has been determined to be satisfactory. After the soak period, the furnace is shut off and while the heat treated anode casing is still in the furnace, desirably with the treatment gas passing therethrough, the casing is subjected to a cooling step wherein it is allowed to cool gradually to ambient temperature, for example, to room temperature between about 20° C. and 30° C. Upon cooling to room temperature the heat treated anode casing is preferably stored away from atmospheric air, for example, in a vacuum sealed bag until it is desired to fill it with anode active material during cell construction.

It has been determined that the heat treating process of the invention as applied to said anode casing reduces gassing in a zinc/air cell utilizing the heat treated casing. The resulting reduction in gassing is significant enough that the need to add mercury to the anode mixture for the purpose of reducing gassing is entirely eliminated.

It is not known with certainty why the heat treatment process of the invention causes a significant reduction in cell gassing. It is theorized that the anode casing inside layer of copper develops surface deposits of copper oxide (Cuo) as well as deposits of other oxides and contaminants during the storage period which can be a period of weeks or months from the time that the casing is formed, e.g. by stamping, until it is actually used in cell assembly. Such oxides can act as a catalyst which increases the rate of the primary gassing reaction between zinc and water to produce zinc oxide and hydrogen gas. The heat treatment process of the invention is believed to reduce the amount of copper oxides and other oxides and contaminants from the surface of the copper layer thereby reducing the rate of hydrogen gas production. The heat treatment process of the invention also produces a smoother copper surface on the inside of the anode casing, which in turn reduces the number of active sites for the gassing reaction to occur.

It has been determined that a particularly desirable zinc/air cell is a cell wherein the anode casing and inner copper layer thereof has been heat treated in accordance with the heat treatment process of the invention and wherein in combination thereof the cell's anode comprises particulate zinc (or zinc alloy) plated with indium. Such zinc/air cell exhibits excellent overall performance eliminating the conventional need to add mercury to the cell.

BRIEF DESCRIPTION OF THE DRAWINGS

The invention will be better understood with reference to the drawings in which.

DETAILED DESCRIPTION

Figure 1:
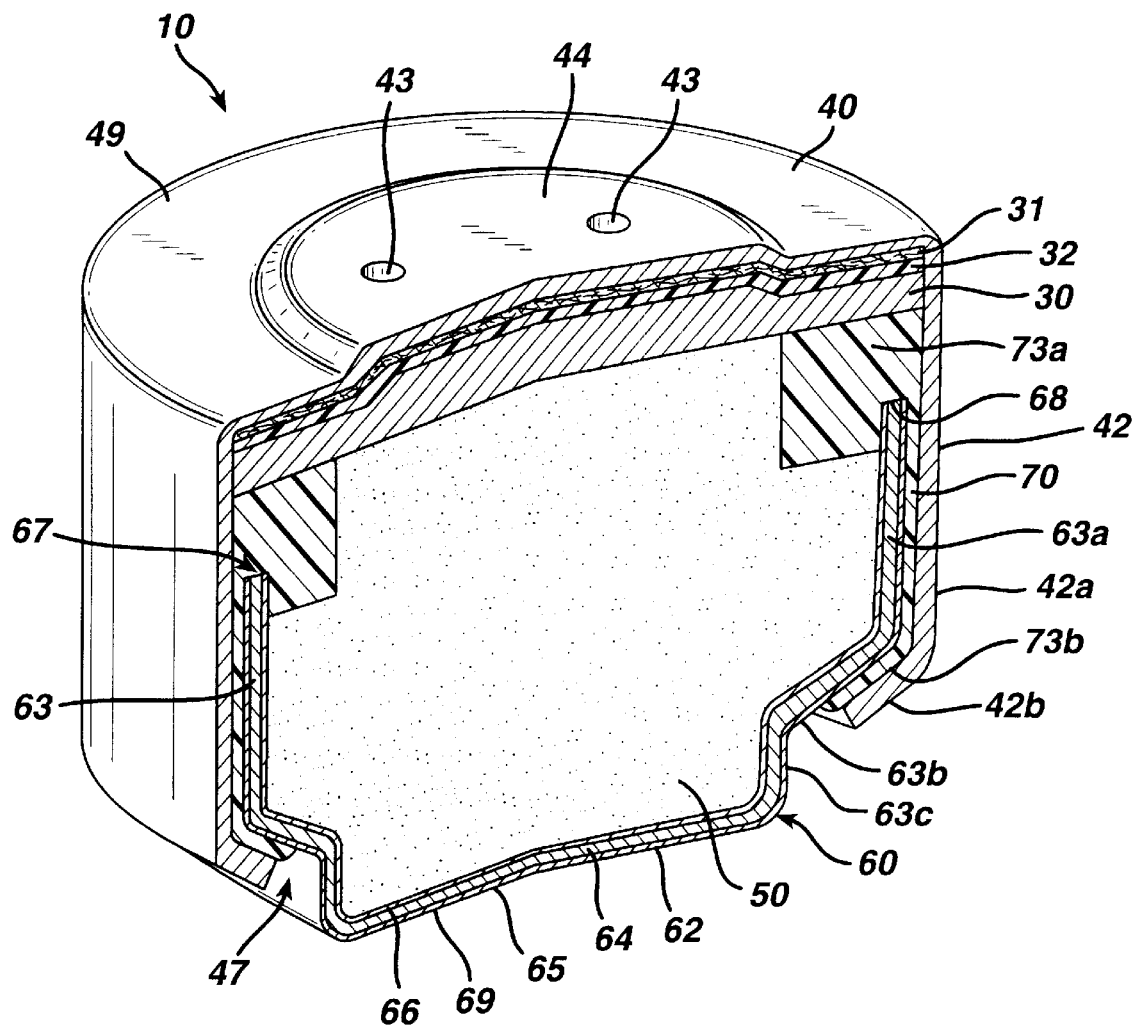
FIG. 1 is an isometric cross sectional view of an embodiment of the zinc/air cell of the invention.

The invention is directed to gas depolarized electrochemical cells. Such cells have a metal anode, typically comprising zinc and an air cathode. The cell is commonly referred to as a metal/air depolarized cell, and more typically a zinc/air cell.

The zinc/air cell of the invention is essentially mercury free and desirably in the form of a miniature button cell. It has particular application as a power source for electronic hearing aids. The miniature zinc/air cell of the invention typically has a disk-like cylindrical shape of diameter between about 4 and 16 mm, preferably between about 4 and 12 mm and a height between about 2 and 9 mm, preferably between about 2 and 6 mm. The miniature zinc/air cell typically has an operating load voltage between about 1.1 volt to 0.2 volt. The cell typically has a substantially flat discharge voltage profile between about 1.1 and about 0.9 volt whereupon the voltage can then fall fairly abruptly to zero. The cell can be discharged at low rates between about 0.5 and 15 milliAmp. The term "miniature cells" or "miniature button cells" as used herein is intended to include such small size button cells, but is not intended to be restricted thereto, since other shapes and sizes for small zinc/air cells are possible. For example, zinc air cells could also be produced in somewhat larger sizes having a cylindrical casing of size comparable to conventional AAAA, AAA, AA, C and D size $Zn/MnO_2$ alkaline cells, and even larger. The present invention is also intended to be applicable to such larger cell sizes and also to other cell shapes, for example, prismatic or elliptical shapes.

The zinc/air cell of the invention does not contain any added mercury (zero added mercury cell) and thus is essentially mercury free. In such zero added mercury cells there is no added mercury and the only mercury present is in trace amounts naturally occurring with the zinc. Accordingly, the cell of the invention has a total mercury content less than about 50 parts per million parts of total cell weight, preferably less than 20 parts per million of total cell weight, more preferably less than about 10 parts per million of total cell weight. (The term "essentially mercury free" as used herein shall mean the cell has a mercury content less than about 50 parts per million parts of total cell weight.) The cell of the invention can have a very small amount of lead additive in the anode. If lead is added to the anode, the lead content in the cell can typically be between about 100 and 600 ppm of total metal content in the anode. However, the cell of the invention can also be essentially lead free, that is, the total lead content can be less than 30 ppm, desirably less than 15 ppm of the total metal content of the anode.

The zinc/air cell 10 of the invention has an anode casing 60, a cathode casing 40, and electrical insulator material 70 therebetween. The anode casing 60 has body 63, an integral closed end 69, and an open end 67. The cathode casing 40 has a body 42, an integral closed end 49 and an open end 47. The anode casing 60 contains an anode mixture 50 comprising zinc and alkaline electrolyte. The cathode casing 40 has a plurality of air holes 43 in its surface at the closed end thereof and a catalytic cathode assembly 30 (FIG. 1) containing catalytic composite material 34 (FIG. 2) placed within the casing proximate to the air holes. During cell discharge, the catalytic material 34 facilitates the electrochemical reaction with ambient oxygen as it ingresses through air holes 43.

It has been determined that if the anode casing 60 of the zinc/air cell 10 of the invention is plated with a layer of copper 66 on its inside surface and the copper is heat treated such as with a hot gas after the casing has been formed but before anode material 50 is inserted therein, a significant reduction in gassing can be realized during cell discharge and storage. The heat treatment process of the invention is believed to eliminate the copper oxides and other oxides and contaminants from the surface of the copper layer thereby reducing the rate of hydrogen gas production during cell discharge and storage. The reduction in cell gassing realized from heat treating the copper layer 66, is significant enough to eliminate the need to add mercury to the anode active mixture 50. In particular it has been determined that the mercury conventionally added in an amount of about 3 percent by weight of the anode mixture can be eliminated without substituting other gassing inhibitors into the zinc and anode mixture. Also, the total amount of zinc in the anode mix 50 can be increased in amount replacing the mercury, resulting in an increase in the cell's capacity (mAmp-hrs).

A preferred embodiment of a zinc/air cell of the invention is shown in FIG. 1. The embodiment shown in FIG. 1 is in the form of a miniature button cell. The cell 10 comprises a cathode casing 40 (cathode cup) an anode casing 60 (anode cup) with an electrical insulator material 70 therebetween. The insulator 70 can desirably be in the form of a ring which can be inserted over the outside surface of the anode casing body 63 as shown in FIG. 1. Insulator ring 70 desirably has an enlarged portion 73*a* extending beyond peripheral edge 68 of the anode casing (FIG. 1). The insulator 70 with enlarged portion 73*a* prevents anode active material from contacting the cathode casing 40 after the cell is sealed. Insulator 70 is of a durable electrically insulating material such as high density polyethylene, polypropylene or nylon which resists flow (resists cold flow) when squeezed.

The anode casing 60 and cathode casing 40 are initially separate pieces. The anode casing 60 and cathode casing 40 are separately filled with active materials, whereupon the open end 67 of the anode casing 60 can be inserted into the open end 47 of cathode casing 40. The anode casing 60 is characterized by having a first straight body portion 63*a* of maximum diameter which extends vertically downwardly (FIG. 1) from peripheral edge 68 to a point which is more than at least 50% of the anode casing 60 height whereupon the casing is slanted inwardly to form slanted midportion 63*b*. There is a second straight portion 63*c* extending vertically downwardly from the terminal end of midportion 63*b*. The second straight portion 63*c* is of smaller diameter than straight portion 63*a*. The portion 63*c* terminates with a 90° bend forming the closed end 69 having a relatively flat negative terminal surface 65. The body 42 of cathode casing 40 has a straight portion 42*a* of maximum diameter extending vertically downwardly from closed end 49. The body 42 terminates in peripheral edge 42*b*. The peripheral edge 42*b* of cathode casing 40 and underlying peripheral edge 73*b* of insulator ring 70 are initially vertically straight and can be mechanically crimped over the slanted midportion 63*b* of the anode casing 60. This locks the cathode casing 40 in place over the anode casing 60 and forms a tightly sealed cell.

Anode casing 60 can be separately filled with anode active material by first preparing a mixture of particulate zinc and powdered gellant material. The zinc average particle size is desirably between about 30 and 350 micron, and larger, for example, up to 500 micron and higher. By average particle size as used herein is meant that 50 percent of the particles by volume have a size greater than the stated value and 50 percent of the particles by volume have a size less than the stated value. The zinc particles can be in the form of particulate zinc alloyed with a small amount, for example, between about 100 and 2000 ppm (based on pure zinc) of an alloy material. The zinc can be pure zinc or can be in the form of particulate zinc alloyed with indium (100 to 1000 ppm). The zinc can also be in the form a particulate zinc alloyed with indium (100 to 1000 ppm) and lead (100 to 1000 ppm). Other alloys of zinc, for example, particulate zinc alloyed with indium (100 to 1000 ppm) and bismuth (100 to 1000 ppm) or zinc alloyed with indium (100 to 1000 ppm), lead (100 to 1000 ppm) and aluminum (25 and 500 ppm) can also be used. These particulate zinc alloys are essentially comprised of pure zinc and have the electrochemical capacity essentially of pure zinc. Thus, the term "zinc" shall be understood to include such materials. The gellant material can be selected from a variety of known gellants which are substantially insoluble in alkaline electrolyte. Such gellants can, for example, be cross linked carboxymethyl cellulose (CMC); starch graft copolymers, for example in the form of hydrolyzed polyacrylonitrile grafted unto a starch backbone available under the designation Waterlock A221 (Grain Processing Corp.); cross linked polyacrylic acid polymer available under the trade designation Carbopol C940 (B.F. Goodrich); alkali saponified polyacrylonitrile available under the designation Waterlock A 400 (Grain Processing Corp.); and sodium salts of polyacrylic acids termed sodium polyacrylate superabsorbent polymer available under the designation Waterlock J-500 or J-550. A dry mixture of the particulate zinc and gellant powder can be formed with the gellant forming typically between about 0.1 and 1 percent by weight of the dry mixture. A solution of aqueous KOH electrolyte solution comprising between about 30 and 40 wt % KOH and about 2 wt % ZnO is added to the dry mixture and the formed wet anode mixture 50 can be inserted into the anode casing 60. Alternatively, the dry powder mix of particulate zinc and gellant can be first placed into the anode casing 60 and the electrolyte solution added to form the wet anode mixture 50.

Figure 2:
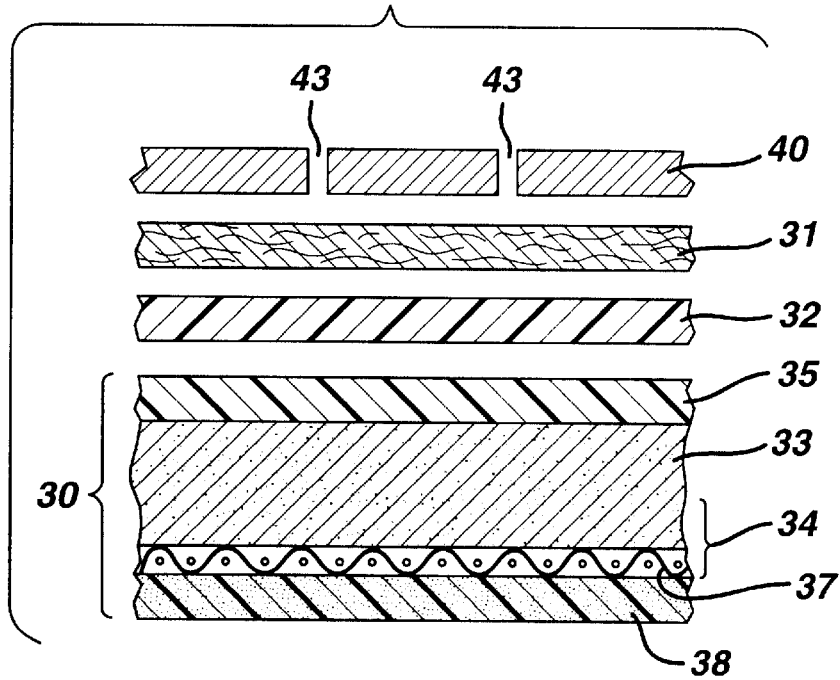
FIG. 2 is an exploded view of the catalytic cathode assembly and air diffuser referenced in FIG. 1.

A catalytic cathode assembly 30 and air diffuser 31 can be inserted into casing 40 as follows: An air diffuser disk 31 (FIGS. 1 and 2), which can be in the form of an air porous filter paper or porous polymeric material can be inserted into the cathode casing 40 so that lies against air holes 43. A separate electrolyte barrier layer 32 (FIGS. 1 and 2), for example, of polytetrafluroethylene (Teflon) can optionally be inserted ever under the air diffuser 31. The barrier layer 32, if employed, should be hydrophobic and desirably functions to prevent electrolyte from leaking from the cell without significantly retarding the inflow of air into the cell. A catalytic cathode assembly 30 as shown in FIG. 2 can be prepared as a laminate comprising a layer of electrolyte barrier material 35, a layer of cathode catalyst composite 34 under the barrier layer 35 and a layer of ion permeable separator material 38 under the catalyst composite 34, as shown in FIG. 2. Each of these layers can be separately prepared and laminated together by application of heat and pressure to form the catalytic assembly 30. The electrolyte barrier layer 35 can desirably be of polytetrafluroethylene (Teflon). The separator 38 can be selected from conventional ion permeable separator materials including cellophane, polyvinylchloride, acrylonitrile, and microporous polypropylene.

Catalytic cathode composite 34 desirably comprises a hydrophobic catalytic cathode mixture 33 of particulate manganese dioxide, carbon, and hydrophobic binder which is applied by conventional coating methods to a surface of an electrically conductive substrate 37, preferably a nickel mesh screen. Alternatively, conductive substrate 37 can be a nickel sheet. Other catalytic materials can be included or employed in composite 34 such as metals like silver, platinum, palladium, and ruthenium or other oxides of metals or manganese ($MnO_x$) and other components known to catalyze the oxygen reduction reaction. During application the catalytic mixture 33 is substantially absorbed into the porous mesh or screen 37. The manganese dioxide used in the catalytic mixture 33 can be conventional battery grade manganese dioxide, for example, electrolytic manganese dioxide (EMD). The manganese dioxide in catalytic mixture 33 can also be manganese dioxide formed from the thermal decomposition of manganese nitrate $Mn(NO_3)_2$. The carbon used in preparation of mixture 33 can be in various forms including graphite, carbon black and acetylene black. A preferred carbon is carbon black because of its high surface area. A suitable hydrophobic binder can be polytetrafluroethylene (Teflon). The catalytic mixture 33 may typically comprise between about 3 and 10 percent by weight $MnO_2$, 10 and 20 percent by weight carbon, and remainder binder. During cell discharge the catalytic mixture 33 acts primarily as a catalyst to facilitate the electrochemical reaction involving the incoming air. However, additional manganese dioxide can be added to the catalyst and the cell can be converted to an air assisted zinc/air or air assisted alkaline cell. In such cell at least a portion of manganese dioxide becomes discharged, that is, some manganese is reduced during electrochemical discharge along with incoming oxygen.

The individual layers, namely barrier layer 35, catalyst composite 34, and separator 38 can be laminated by application of heat and pressure to form the catalytic assembly 30 shown in FIG. 2. Assembly 30 can be inserted into the cathode casing 40 so that it abuts air diffuser 31 with separator layer 38 facing the open end of casing 40, as shown in FIG. 1. After the air diffuser 31 and catalytic assembly 30 are inserted into casing 40, the open end 67 of the filled anode casing 60 can be inserted into the open end 47 of cathode casing 40. The peripheral edge 42b of the cathode casing can be crimped over the slanted midportion 63b of the anode casing with a portion of insulator 70 therebetween, as above described.

Figure 3:
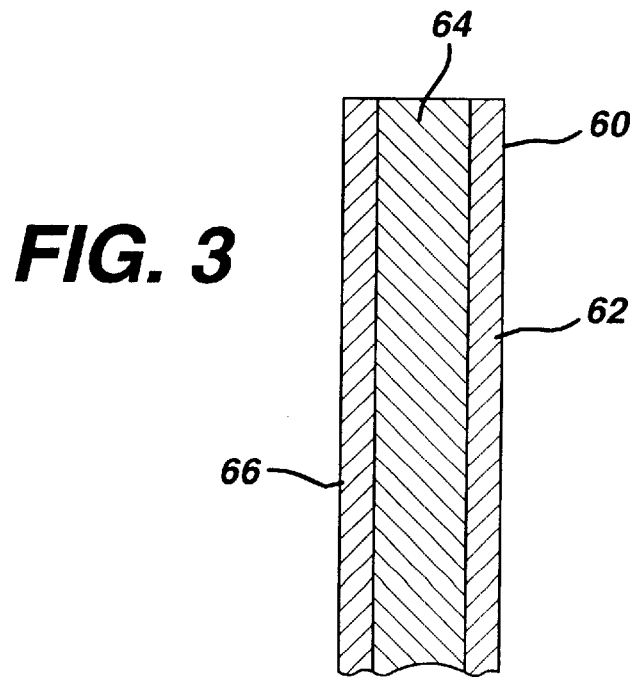
FIG. 3 is a cross sectional view of an embodiment of the cathode casing wall.

In the preferred embodiment (FIG. 1) the anode casing 60 has a layer of copper 66 plated or clad on its inside surface so that in the assembled cell the zinc anode mix 50 contacts the copper layer. The copper plate is desired because it provides a highly conductive pathway for electrons passing from the anode 50 to the negative terminal 65 as the zinc is discharged. The anode casing 60 is desirably formed of stainless steel which is plated on the inside surface with a layer of copper. Preferably, anode casing 60 is formed of a triclad material composed of stainless steel 64 with a copper layer 66 on its inside surface and a nickel layer 62 on its outside surface as shown in FIG. 3. Thus, in the assembled cell 10 the copper layer 66 forms the anode casing inside surface in contact with the zinc anode mix 50 and the nickel layer 62 forms the anode casing's outside surface.

The copper layer 66 desirably has a thickness between about 0.0002 inches (0.005 mm) and 0.002 inches (0.05 mm). The stainless steel typically has a thickness between about 0.001 inches (0.0254 mm) and 0.01 inches (0.254 mm) and the nickel layer between about 0.0001 inches (0.00254 mm) and 0.001 inches (0.0254 mm). The total wall thickness of the anode casing 60 composed of the triclad material can be desirably between about 0.001 inches (0.0254 mm) and 0.015 inches (0.38 mm).

In the process of the invention anode casing 60 can be first stamped into a shape the same or similar to that shown in FIG. 1. The anode casing can be formed of the above triclad material having a copper layer 66 forming the casing's inside surface. In accordance with the invention after the casing 60 has been stamped into the desired shape, the copper surface is heat treated (post heat treatment), preferably by subjecting the anode casing 60 to a flowing treating gas preferably a reducing gas which has been heated to temperature between about 200° C. and 700° C., preferably between about 300° C. and 600° C. Other well known heat treatment and gas contacting methods may be used. A preferred reducing gas is a mixture of hydrogen and nitrogen, desirably 5 percent by weight hydrogen and about 95 percent by weight nitrogen. The heat treatment can be conveniently accomplished by placing the anode casing 60 in a ceramic casing or boat which is open at its top. The ceramic casing with casing 60 therein can be placed into a quartz receiving tube within an electrically heated quartz furnace. The treating gas may be at or below ambient temperature as it enters the furnace, but is heated almost instantly to furnace temperature as it passes slowly through the furnace and contacts the anode casing. Thus, the initial temperature at which the gas contacts the anode casing can be room temperature (20° C.). However, the initial temperature at which the gas contacts the anode casing can be at higher temperature, for example, between about room temperature 20° C. and 30° C. While the casing 60 is in the furnace and the treating gas is being passed therethrough and in contact with the anode casing, the heat treatment can be accomplished in essentially two steps (a) an initial heating period (ramp period) wherein the furnace temperature and consequently the temperature of the reducing gas passing therethrough gradually increases from said initial temperature to a desired elevated temperature and (b) a primary (soak) heating period wherein the gas temperature is maintained at the elevated temperature for set period time (soak period).

During the initial (ramp) heating period the furnace temperature and therefore also the temperature of the treating gas passing therethrough is gradually raised at a rate of between about 5 and 15 degrees centigrade per minute. The treating gas flow rate is preferably maintained at a slow rate desirably between about 8 and 10 cubic centimeters per minute during the initial (ramp) heating period. However, the treating gas flow can be at higher rates, for example, turbulent flow rates. The initial (ramp) heating can typically be for a period between about 15 and 60 minutes and even longer depending on the rate of furnace temperature increase selected. The initial (ramp) heating is carried out until the desired elevated soak temperature is reached. The desired soak temperature can be a temperature between about 200° C. and 700° C., preferably between about 300° C. and 600° C., more preferably between about 400° C. and 600° C. The soak temperature is preferably maintained at a constant temperature for operational ease and consistency of product. However, it will be appreciated that the soak temperature can be varied during the primary (soak) heating period as long as it is maintained within a range from 200° C. to 700° C., preferably between about 300° C. and 600° C. Once the soak temperature is reached, the anode casing 60 is exposed to the flowing reducing gas at soak temperature for a relatively short period of between about 5 and 25 minutes (primary heating period), preferably for about 15 minutes.

The flow rate of the treating gas during the soak period can be varied during the period and increased to higher rates. However, it is satisfactory to maintain the treating gas at about the same flow rate during both the initial and the primary heating periods, namely, at a slow rate of between about 8 and 10 cubic centimeters per minute.

After the primary (soak) heating period, the furnace is shut off and while the heat treated casing 60 is still in the furnace, the casing is allowed to cool gradually to room temperature, e.g. to a temperature between about 20° C. and 30° C., preferably while still under flow contact with reducing gas. Upon cooling to room temperature the heat treated anode casing is stored in a vacuum sealed bag until it is desired to fill it with zinc anode mixture during cell preparation.

The above described heat treatment of the anode casing 60 can be accomplished with a treating gas which is an inert gas such as argon. However, the preferred treatment gas is a reducing gas, for example, a gas comprising about 5 wt. % hydrogen and 95 wt. % nitrogen. It is convenient to maintain the gas at the same composition during the entire treating period.

The benefit of the invention can be demonstrated by the following examples.

EXAMPLE 1

No Added Mercury/Anode Casing Heat Treated With Reducing Gas

The anode casing 60 of triclad material having an outer layer of nickel 62, a midlayer of stainless steel 64, and an inner layer of copper 66 is prepared from sheet material. The anode casing wall total thickness is about 0.0119 inches (0.302 mm). The stainless steel layer has a thickness of about 0.009 inches (0.229 mm) and the nickel layer has a thickness of about 0.000928 inches (0.0236 mm). The copper layer has a thickness of about 0.00194 inches (0.049 mm). The triclad sheet material is stamped into shape forming an empty anode casing 60 of configuration as shown in FIG. 1. The anode casing so formed was subjected to the above described heat treatment process with a reducing gas composed of 5 percent by weight hydrogen and 95 percent by weight nitrogen.

Specifically, the empty anode casing 60 was placed in an open ceramic boat which in turn was placed into a quartz furnace. The anode casing was subjected to an initial (ramp) heating period with the reducing gas flowing single pass through the furnace at a rate of about 8 to 10 cc/min. The temperature of the furnace and consequently the temperature of the reducing gas passing over and in contact with the anode casing was increased gradually at a rate of about 15° C. per minute from ambient temperature (20° C.) until a desired soak temperature of about 215° C. was reached. The furnace was then maintained at about soak temperature. The anode casing 60 was heated in a primary (soak) period for a period of about 5 minutes with the reducing gas passing over the anode casing at a constant soak temperature of about 215° C. during the period. The reducing gas flow rate through the furnace during the soak period was at a rate of about 8 to 10 cc/min. The furnace was then shut off and the anode casing 60 allowed to cool gradually to ambient temperature. The cooling period took about 5 to 12 hours depending on the peak soaking temperature. The casing was then removed from the furnace and preferably stored away from air, for example, in a vacuum bag.

A miniature zinc/air cell was then prepared having the components as above described (FIG. 1). The cell had an overall diameter of about 0.608 inches (15.4 mm) and a height (positive to negative terminal) of about 0.314 inches (7.98 mm). The anode casing 60 used was heat treated at 215° C. as above described. The cathode casing 40 was nickel plated steel having a wall thickness of about 0.01 inches (0.25 mm). The cathode catalyst composite 37 had the following composition: $MnO_2$ 4.6 wt. %, carbon black 15.3 wt %, Teflon binder 18.8 wt. %, and nickel mesh screen, 61.2 wt. %. The total cathode catalyst composite 37 was 0.140 g. The anode 50 contained zero added mercury (mercury content was less than 20 ppm of cell weight) and had the following composition: zinc 77.8 wt % (the zinc was alloyed with 200 to 500 ppm each of indium and lead), electrolyte (40 wt % KOH and 2 wt % ZnO) 21.9 wt. %, gelling agent (Waterlock J-550 ) 0.3 wt %, lead 400 ppm (0.04 wt %). The total anode 50 was 2.43 g and the zinc was 1.9 g.

The cells were divided into two groups. One group was discharged at a constant load of 220 ohms to a cut-off voltage of 0.2 volt and the discharged cells stored in sealed foiled bags at ambient temperature for 7 days. A second group was stored in sealed foil bags at ambient temperature for 30 days without discharging the cells. The amount of gassing which occurred in each group of cells was determined: In the first group (discharged cells) the gassing that occurred during cell discharge and during subsequent storage was determined and is reported in the Table 1. In the second group (undischarged cells) the gassing that occurred during the one month storage at ambient temperature was determined and reported in Table 2. The tabulated data consists of the gas which is retained in the cell (in-cell) and the gas which escapes from the cell while it is stored in foil bags (in-bag). Cells that were discharged were placed in bags after the discharge was complete.

The amount of gassing which occurred while the cells were stored in the sealed foil bags was determined by comparing the difference in total bag weight before and after the storage period. The amount of gassing which became entrapped in the cell (residual gas) was determined by a cell puncture test. The test involves puncturing the cell with a needle and measuring the amount of gas released.

Another identical triclad anode casing was heated treated in the same manner except that the soak temperature was about 500° C. The furnace was then maintained at the soak temperature. The anode casing 60 was heated in a primary (soak) period for a period of about 15 minutes with the reducing gas passing over the anode casing at a constant soak temperature of about 500° C. during the period. The furnace was then shut off and the anode casing allowed to cool to ambient temperature. The cooling period took about 8 hours. The casing was removed from the furnace and stored in a vacuum bag. Cells were then assembled with identical anode and cathode catalyst compositions as described earlier in this example. The anode casing which was heat treated at 500° C. was used in the cell assembly. The cells were divided into two groups. One group was discharged at a constant load of 220 ohms to a cut-off voltage of 0.2 volt and the discharged cells stored in sealed foiled bags at ambient temperature for 7 days. A second group was stored in sealed foil bags at ambient temperature for 30 days without discharging the cells. The amount of gassing which occurred in each group of cells was determined: In the first group (discharged cells) the gassing that occurred during cell discharge and during subsequent storage was determined and is reported in the Table 1. In the second group (undischarged cells) the gassing that occurred during the one month storage at ambient temperature was determined and reported in Table 2.

EXAMPLE 2 (Comparative)

No Added Mercury/Anode Casing Not Heat Treated After Stamping

Identical cells were prepared as described in Example 1 having the same size and components, same anode triclad casing and cathode catalyst composition and same (zero added mercury) anode composition except that anode casing was not heat treated after it was stamped into shape.

As in Example 1 the cells were divided into two groups. One group was discharged at a constant load of 220 ohms to a cut-off voltage of 0.2 volt and the discharged cells stored in sealed foiled bags at ambient temperature for 7 days. A second group was stored in sealed foil bags at ambient temperature for 30 days without discharging the cells. The amount of gassing which occurred in each group of cells was determined: In the first group (discharged cells) the gassing that occurred during cell discharge (in cell) and during subsequent storage (post discharge) was determined and is reported in the Table 1. In the second group (undischarged cells) the gassing that occurred during the one month storage at ambient temperature was determined and reported in Table 2.

EXAMPLE 3 (Comparative)

Mercury Added to Anode/Anode Casing Not Heat Treated After Stamping

Identical cells were prepared as described in Example 1 having the same size and components, same anode triclad casing and cathode catalyst composition except that mercury was added to the anode and the anode casing was not heat treated after it was stamped into shape. Anode 50 had the same quantity of zinc (1.9 g) as in Example 1. The anode 50 had the following composition: zinc 76.0 wt %, electrolyte (40 wt % KOH and 2 wt % ZnO) 21.3 wt. %, gelling agent (Waterlock J-550 ) 0.3 wt %, lead 400 ppm (0.04 wt %), mercury 2.4 wt. %. The total anode 50 was 2.48 g. The cathode catalyst composite 37 had the following composition: $MnO_2$ 4.6 wt. %, carbon black 15.3 wt %, Teflon binder 18.8 wt. %, and nickel mesh screen, 61.2 wt. % as in Example 1. The total cathode catalyst composite was 0.140 g.

As in Example 1 the cells were divided into two different groups. One group was discharged at a constant load of 220 ohms to a cut-off voltage of 0.2 volt and the discharged cells stored in sealed foiled bags at ambient temperature for 7 days. A second group was stored in sealed foil bags at ambient temperature for 30 days without discharging the cells. The amount of gassing which occurred in each group of cells was determined: In the first group (discharged cells) the gassing that occurred during cell discharge (in cell) and during subsequent storage (post discharge) was determined and is reported in the Table 1. In the second group (undischarged cells) the gassing that occurred during the one month storage at ambient temperature was determined and reported in Table 2.

TABLE 1

GASSING IN DISCHARGED Zn/Air CELLS

| Cell | Amp-HR to 0.2 V at 220 Ohm Load | Gassing In-Bag, ml | Gassing In-Cell, ml | Total Gassing, ml |
|---|---|---|---|---|
| Example 1 | | | | |
| Heat Treat[1] at 215° C. | 1.21 | 0.2 | 0.4 | 0.6 |
| Heat Treat[1] at 500° C. | 1.21 | 0.0 | 0.3 | 0.3 |
| Comparative[2] Example 2 | 1.19 | 4.6 | 0.7 | 5.3 |
| Comparative[3] Example 3 | 1.32 | 0.0 | 0.5 | 0.5 |

Notes:
[1]Post heat treat anode triclad casing with reducing gas (5 wt. % hydrogen and 95 wt. % nitrogen) after casing was formed. No mercury added to anode.
[2]No mercury added to anode. Anode casing not post heat treated after it was formed.
[3]Mercury added to anode. Anode casing was not post heat treated after it was formed.

TABLE 2

GASSING IN UNDISCHARGED Zn/Air CELLS

| Cell | Gassing In-Bag, ml | Gassing In-Cell, ml | Total Gassing, ml |
|---|---|---|---|
| Example 1 Heat Treat[1] at 500° C. | 0.1 | 0.1 | 0.2 |
| Comparative[2] Example 2 | 1.9 | 0.2 | 2.1 |

Notes:
[1]Post heat treat anode triclad casing with reducing gas (5 wt. % hydrogen and 95 wt. % nitrogen) after casing was formed. No mercury added to anode.
[2]No mercury added to anode. Anode casing was not post heat treated after it was formed.

An inspection of the results reported in Table 1 shows a significant reduction in cell gassing occurring with the discharged cell of the invention (Example 1) with zero added mercury but with post heat treatment of the anode casing compared to the gassing reported with discharged comparative cell (Example 2) with zero added mercury and no post heat treatment of the anode casing. Additionally, the results reports in Table 1 show about the same level of gassing and only slightly less cell discharge capacity with the post heat treated anode casing/zero added mercury cell of the invention (Example 1) compared to that obtained with the comparative cell (Example 3) which employed about 3 wt. % mercury and no post heat treatment of the anode casing. Thus, it has been determined that instead of adding mercury to the anode material the same effect in gassing reduction and overall performance can be realized by post heat treating the anode casing. Also, there was no leaking of electrolyte in the cells with anode casing post heat treated in accordance with the invention, even though mercury was not added to the anode.

Inspection of the results reported in Table 2 shows a significant reduction in cell gassing occurring with the undischarged cell of the invention (Example 1) with no added mercury but with post heat treatment of the anode casing compared to the gassing reported with the comparative cell (Example 2) with zero added mercury and no post heat treatment of the anode casing.

The post heat treatment of the anode casing in the above examples was accomplished using a reducing gas composed of 5 wt. % hydrogen and 95 Wt. % nitrogen. Identical cells as in Example 1 (zero added mercury) were prepared but with the anode casing 60 post heat treated in identical manner but using argon gas instead of the 5 wt. % reducing gas. The cells were discharged in the same manner as in Example 1 (at 220 ohm constant load to a cutoff voltage of 0.2V). The total amount of gassing which occurred (during discharge and after one week storage post discharge) was determined in the same manner as in Example 1. The cells having their anode casing post heat treated with argon gas showed less gassing than the same (zero added mercury) cells with anode casing which were not post heat treated. However, the reduction in gassing is more pronounced when a reducing gas such as mixture of 5 wt. % hydrogen and 95 wt. % nitrogen is used during the heat treatment process. For example, the total gas emission of a discharged (zero added mercury) cell having anode casing post heat treated with reducing gas (5 Wt. % hydrogen and 95 wt. % nitrogen) at 500° C. was 0.3 ml. By comparison the total gas emission of the discharged (zero added mercury) cell having anode casing post heat treated with argon gas at 500° C. was 0.4 ml and the total gas emission of a like discharged (zero added mercury) cell with the anode casing not post heat treated was 5.3 ml.

Zinc/air cells can be advantageously constructed wherein the anode casing 60 and consequently copper inner layer 66 thereof is subjected to heat treatment by the heat treatment process of the invention as above described. It has been further determined desirable to employ an anode for the cell which comprises zinc alloy particles which have been plated with indium. The indium plating can desirably be achieved in accordance with preferred embodiments of the plating process as follows:

The zinc particles can be blended with indium acetate powder in a electric blender in a step 1 for about 10 minutes or until a homogeneous mixture is obtained. An aqueous solution of acetic acid (2 wt. % acetic acid in water) can then be added to the mixture of zinc particles and indium acetate powder and additionally blended in an electric blender in step 2 for about 10 minutes to achieve a homongenous mixture. Desirably between about 300 and 500 ppm indium is plated onto the surface of the zinc particles.

Alternatively, the zinc particles can first be blended in a first step with an aqueous solution of acetic acid (2 wt. % acetic acid in water) for about 10 minutes or until a homogeneous mixture is obtained. Indium acetate powder can then be added to the mixture and additionally blended in a second step in an electric blender for about 10 minutes to achieve a homogeneous mixture. Desirably between about 300 and 500 ppm indium is plated onto the surface of the zinc particles.

The zinc average particle size is desirably between about 30 and 350 micron. The zinc particles can be in the form of particulate zinc alloyed with indium (100 to 1000 ppm). The zinc can also be in the form a particulate zinc alloyed with indium (100 to 1000 ppm) and lead (100 to 1000 ppm). The zinc can be in the form of particulate zinc alloyed with 100 and 1000 ppm indium, 100 and 1000 ppm lead, and 10 to 500 ppm aluminum. Other alloys of zinc, for example, particulate zinc alloyed with indium (100 to 1000 ppm) and bismuth (100 to 1000 ppm) can also be used. These particulate zinc alloys are essentially comprised of pure zinc and have the electrochemical capacity essentially of pure zinc. Thus, the term "zinc" shall be understood to include such materials. A preferred zinc alloy used in the plating process of the invention is particulate zinc of particle size between about 200 and 250 micron alloyed with 500 ppm indium, 500 ppm lead, and 50 ppm aluminum. Such particulate zinc alloy is available from Union Miniere Company under the trade designation Union Miniere 189 zinc alloy. A specific plating protocol is illustrated in the following Example 3.

EXAMPLE 3

Anode Comprising Zinc Particles Plated With Indium

A specific batch of indium plated zinc alloy can be prepared as follows:

A 2 wt. % solution of acetic acid can be prepared by adding 20.0 g of glacial acetic acid (99.7% assay) to a thoroughly rinsed beaker followed by addition of 980.0 g of deionized water. 2000 g of the above described particulate zinc alloy (Union Miniere 189 particulate zinc alloy, average particle size between about 200 and 250 micron) can be blended with 1.794 g of indium acetate powder in step 1 for about 10 minutes until a homogeneous mixture is obtained. The indium acetate powder becomes finely dispersed throughout the zinc particles. The total concentration of indium in the mixture based on pure zinc is about 900 ppm. (500 ppm indium is from the amount of indium in the zinc alloy and the remaining 400 ppm is from the indium acetate.) 3.20 g of the 2 wt. % acetic acid solution can then be added to the mixture from step 1 and blended in an electric blender in step 2 for about 10 minutes until a homogeneous mixture is obtained. The acetic acid functions to clean the surface of the zinc alloy particles and reduces the amount of surface oxides to make the zinc particles more receptive to indium plating. The acetic acid also functions as a solvent for the indium ions to enable the plating reaction to take place. The indium from the indium acetate dissolves in the acetic acid and plates onto the surface of the zinc alloy particles. About 400 ppm indium based on zinc is plated onto the surface of the zinc particles. The indium acetate concentration can be adjusted to achieve a plating of between about 50 and 1000 ppm indium plate based on zinc in order to improve the capacity and performance of the zinc on cell discharge. Desirably the indium plate is between about 200 and 600, for example, between about 300 and 500 ppm based on zinc. A gelled zinc anode mixture 50 can be prepared by adding alkaline electrolyte (40 wt. % KOH, 2 wt. % ZnO) aqueous solution and gelling agent, preferably Waterlock J-550 gellant to the mixture resulting after step 2, now containing the indium plated zinc particles. The gellant is preferably added in the ratio of 6.6 g Waterlock J-550 gellant to 2 Kg of zinc.

The above quantity of acetic acid relative to the above indicated amount of indium acetate enables efficient plating of the dissolved indium onto the zinc surface without introducing excess moisture into the blend. Desirably the weight ratio of indium acetate to acetic acid solution (2 wt. % acetic acid in water) is between about 0.2 and 0.6 and the weight ratio of zinc particles to indium acetate is between about 450 and 9000. These concentrations yield nominal indium plating values in a desired range between about 50 and 1000 ppm, typically between about 200 and 600 ppm, based on pure zinc without introducing excess moisture into the mixture. Such excess moisture resulting from excess acetic acid is undesirable since it can cause the indium acetate powder to clump somewhat making it more difficult to achieve a free flowing homogeneous mixture and thus impair the plating operation. Excessive acetic acid can also lead to larger globules of plated indium instead of the desired fine uniform dispersion of the indium over the zinc particle surface.

The overall plating reaction can be represented by the replacement reaction (I) as follows where the acetate ion [$CH_3COO$]—is represented by the symbol Ac.

$$3Zn + 2In(Ac)_3 = 2In + 3Zn(Ac)_2 \qquad (I)$$

When the indium acetate dissolved in the acetic acid solution, indium ions are formed. As may be seen from the reaction the electrons required to reduce the ionic indium in acetate solution to metallic indium comes from the zinc as it dissolves in the solution. As metallic indium is formed it becomes plated onto the surface of the zinc alloy particles. From laboratory tests conducted it is believed that approximately between about 75 and 85% (plating efficiency) of the indium in the acetate solution plates onto the zinc particles. However, the remaining indium in the acetate solution appears to get plated onto the zinc particles insitu during cell discharge and rest periods in the course of cell usage.

Zinc/air test cells having the configuration and components as shown and described with reference to FIGS. 1 and 2 were prepared. Before the cells were constructed the anode casings 60 were all subjected to the process of heat treating the casings's inside copper surface 66 in a manner similar to that described with reference to Example 1 with the target soak temperature at 500° C. Specifically, in accomplishing the heat treating the anode casings were placed in an aluminum foil lined ceramic boat and placed in a quartz tube furnace. The furnace chamber with the anode casings therein was purged with a gas having a composition of 95 wt. % nitrogen and 5 wt. % hydrogen for 1 hour and then subjected to initial heating with the reducing gas making a single pass therethrough. The reducing gas was passed over the anode casings at a flow rate of 860 $cm^3$/min and the casings were subjected to an initial heating period (ramp heating) at a rate of approximately 25° C. per minute from ambient temperature until reaching a setpoint soak temperature of 500° C. Upon reaching the soak temperature of 500° C., the furnace was maintained at 500° C. for 20 minutes while the reducing gas was continually passed over the casings. The furnace was then shut off and the anode casings were allowed to cool gradually to ambient temperature over a period of about 5 to 6 hours. The reducing gas flow rate was maintained at approximately 860 $cm^3$/min during the initial (ramp) heating, soaking, and cooling periods. After cooling, the anode casings were removed from the furnace and stored in sealed plastic bags ("Ziplock bags") until it was time to construct the cells.

The cells were constructed in the manner generally described with reference to FIGS. 1 and 2 using the heat treated anode casings. The cathode assembly 30 including cathode composition 33, air diffuser 31, electrolyte barrier layer 32, was essentially the same as that disclosed with respect to that described with respect to FIGS. 1 and 2 and Example 1. The cathode composition 33 was coated onto a conductive substrate 37 of nickel sheet instead of a nickel mesh screen. The anode mixture 50 was prepared and had the composition essentially as described with respect to Example 1, except that the zinc alloy particles were plated with indium in the manner above described. The anode mixture 50 contained zero added mercury (less than 20 ppm mercury based on cell weight). Specifically, the zinc particles were plated with 400 ppm indium as described in the above specific protocol (Example 3) using the above referenced zinc alloy particles Union Miniere 189 zinc alloy (200 to 250 micron average particle size).

The test cells were fabricated as size 13 zinc/air cells having a cell diameter of 0.305 inches (7.75 mm) and height of 0.207 inches (5.26 mm). The zinc/air size 13 cell is equivalent to the International Electrochemical Commission (IEC) "PR48" size cell. The cathode casing 40 of each test cell was of nickel plated steel having a total thickness of 0.004 inches (0.102 mm). The anode casing 60 was of triclad material of stainless steel 64 with a layer 62 of nickel on the outside and layer 66 of copper on the inside as shown and described with reference to FIGS. 1 and 3. The anode casing 60 had a total thickness of 0.004 inches (0.102 mm). The copper layer was 0.00028 inches (0.00711 mm), the stainless steel layer was 0.00364 inches (0.0925 mm), and the nickel layer was 0.00008 inches (0.00203 mm). The inside layer of copper was heat treated by passing reducing gas (95 wt. % nitrogen and 5 wt. % hydrogen) over the anode casing in a quartz furnace in the manner hereinabove described this example.

An anode mixture 50 was inserted into the heat treated anode casing 60 of the above indicated size 13 test cells. The anode mixture 50 (with zero added mercury) had the following overall composition: 79.2 wt. % zinc alloy, 20.5 wt. % electrolyte (electrolyte solution of 40 wt. % KOH and 2 wt. % ZnO), 0.26 wt. % Waterlock J-550 gelling agent, 0.07 wt. % indium acetate, 0.0025 wt. % acetic acid. This resulted in the zinc alloy being plated with 400 ppm indium as above described. The specific zinc alloy used was Meniere 189 zinc alloy (200–250 micron average particle size). The total weight of the zinc anode mixture (zinc and electrolyte) in the cell was 0.443 grams.

A catalytic cathode composite 34 was inserted into the cathode casing 40 of the above indicated size 13 test cells. The catalytic cathode composite 34 had the following overall composition: $MnO_2$ 4.6 wt. %, carbon black 15.3 wt. %, Teflon binder 18.8 wt. %, and nickel plated steel sheet, 61.2 wt. %. The total catalytic cathode composite 34 including the nickel plated steel sheet was 0.034 grams.

Identical comparative cells of same size, construction and composition were prepared using the same zinc alloy particles in the anode, except that the zinc alloy particles were not plated with indium. The copper layer 66 comprising the inside layer of anode casing of the comparative cell was heat treated in the same manner as the inside copper layer of the test cells. The test cells and comparative cells were discharged at low drain (1500 ohm load) for 12 hour per day to a cutoff voltage of 0.9 volt. The performance data is reported in Table 3. As shown in Table 3 the test cells exhibited nearly 11 percent greater capacity and energy output than the comparative cells.

TABLE 3

Performance of Zn/Air CELLS

| Cell | Capacity (Amp-Hr) @ 1500 Ohm for 12 hour/day to 0.9 V | Energy Output (Watt-hr) @ 1500 Ohm for 12 hour/day to 0.9 V |
| --- | --- | --- |
| Test Cells Example 3 Indium Plated Zinc[1] Heat Treat Can at 500° C. | 0.267 | 0.337 |
| Comparative[2] Cells | 0.241 | 0.304 |

Notes:
[1]Anode material comprised zinc particles (Union Miniere 189 zinc alloy) which were plated with 400 ppm indium based on zinc.) No mercury added to anode. Triclad anode casing was heat treated with reducing gas (5 wt. % hydrogen and 95 wt. % nitrogen) after casing was formed before adding anode material.
[2]Anode material comprised zinc particles (Union Miniere 189 zinc alloy) which were not plated with indium or any other metal.) No mercury added to anode. Triclad anode casing was heat treated with reducing gas (5 wt. % hydrogen and 95 wt. % nitrogen) after casing was formed before adding anode material.

Additionally, it has been determined that the total cell gassing is further reduced by employing indium plated zinc in zinc/air cells wherein the copper inside layer of the anode casing was also heat treated by the process of the invention. The reduction on gassing attributed to the heat treatment process of the invention was discussed with reference to Tables 1 and 2. However, employing indium plated zinc in heat treated cells (zero added mercury cells), for example, as referenced in Table 3 further reduces the total amount of gassing by about 40 percent, beyond the reduction in gassing attributed to the heat treatment. This gas reduction value is for undischarged cells. With respect to discharged cells of Table 3, the total gassing is decreased by about 60 percent beyond what was achieved with heat treatment. Accordingly, the use of indium plated zinc in the anode of a zinc/air cell has the compound beneficial effect of increasing capacity and further reducing gassing. This removes the need to add mercury to such zinc/air cells.

Although the invention has been described with reference to specific embodiments, it should be appreciated that other embodiments are possible without departing from the concept of the invention. Thus, the invention is not intended to be limited to the specific embodiments but rather its scope is reflected by the claims and equivalents thereof.

What is claimed is:

1. A zinc/air depolarized cell comprising an anode casing and a cathode casing, an anode material comprising zinc particles within said anode casing, an alkaline electrolyte within said anode casing, and a cathode within said cathode casing, said zinc particles plated with between about 50 and 1000 ppm indium based on the weight of pure zinc, wherein the anode casing has a layer of copper on its inside surface facing the casing interior, said anode casing being subjected to heat treating by passing a gas at a temperature between about 200° C. and 700° C. in contact therewith to form a heat treated anode casing before anode material is inserted into said casing.

2. The cell of claim 1 wherein said zinc particles are plated with between about 200 and 600 ppm indium based on the weight of pure zinc.

3. The cell of claim 1 wherein said zinc particles have an average particle size between about 30 and 350 micron ($30 \times 10^{-6}$ and $350 \times 10^{-6}$ meter).

4. The cell of claim 1 wherein said zinc particles comprises zinc alloyed with an alloy material comprising indium.

5. The cell of claim 1 wherein said zinc particles comprises zinc alloyed with an alloy material comprising indium, lead and aluminum.

6. The cell of claim 4 wherein said alloy material comprises between about 100 and 2000 ppm based on pure zinc.

7. The cell of claim 1 wherein said cathode is a catalytic cathode comprising $MnO_2$.

8. A zinc/air depolarized cell comprising an anode casing and a cathode casing, said anode casing formed of a metal sheeting, an anode material inserted in the anode casing so that it contacts said sheeting, said anode material comprising zinc particles wherein said zinc particles are plated with indium, an alkaline electrolyte within said anode casing, and a cathode within said cathode casing, wherein said metal sheeting comprises a layer of copper on its inside surface and said zinc is in contact with said copper layer, wherein said copper layer on said sheeting is subjected to heat treating before said anode material is placed in contact therewith, said heat treating comprising:

(a) heat treating said metal sheeting by passing a gas at a temperature between about 200° C. and 700° C. in contact therewith to form a heat treated anode casing; and (b) cooling said heat treated sheeting to ambient temperature.

9. The cell of claim 8 wherein said copper layer is subjected to heat treating after said anode casing is formed but before said anode material is inserted therein.

10. The cell of claim 8 wherein said zinc particles are plated with between about 200 and 600 ppm indium based on the weight of pure zinc.

11. The cell of claim 8 wherein said zinc particles have an average particle size between about 30 and 350 micron ($30 \times 10^{-6}$ and $350 \times 10^{-6}$ meter).

12. The cell of claim 8 wherein said zinc particles have an average particle size between about 300 and 500 micron ($300 \times 10^{-6}$ and $500 \times 10^{-6}$ meter).

13. The cell of claim 8 wherein said zinc particles comprises zinc alloyed with an alloy material comprising indium.

14. The cell of claim 8 wherein said zinc particles comprises zinc alloyed with an alloy material comprising indium, lead and aluminum.

15. The cell of claim 13 wherein said alloy material comprises between about 100 and 2000 ppm based on pure zinc.

16. The cell of claim 9 further comprising the step (c) of storing said heat treated anode casing away from atmospheric air until said anode material is included therein.

17. The cell of claim 8 wherein said metal sheeting forming the anode casing is of triclad material comprising stainless steel having a layer of nickel on its outside surface and a layer of copper on its inside surface, said copper layer in contact with said zinc.

18. The cell of claim 17 wherein the anode casing has a wall thickness between about 0.001 inches (0.0254 mm) and 0.015 inches (0.38 mm).

19. The cell of claim 17 wherein the copper layer has a thickness of between about 0.0002 inches (0.005 mm) and 0.002 inches (0.05 mm).

20. The cell of claim 17 wherein said heat treating removes oxides on the surface of said copper layer.

21. The cell of claim 17 wherein said oxides comprise copper oxide.

22. The cell of claim 17 wherein said gas is a reducing gas.

23. The cell of claim 22 wherein said gas is a reducing gas comprising hydrogen.

24. The cell of claim 17 wherein said heat treating is accomplished with a gas at a temperature range between about 300° C. and 600° C.

25. The cell of claim 17 wherein said heat treating is accomplished with a gas within a temperature range between about 400° C. and 600° C.

26. The cell of claim 17 wherein the heat treating in step (a) is carried out by passing said gas over said anode casing within a furnace.

27. The cell of claim 17 wherein said heat treating in step (a) is carried out by (a.1) initially heating said metal sheeting by increasing the gas temperature while the gas contacts said metal sheeting until a soak temperature between about 300° C. and 600° C. is reached and then (a.2) maintaining said metal sheeting in contact with said gas at said soak temperature between about 300° C. and 600° C. for a period between about 5 and 25 minutes.

28. The cell of claim 26 wherein said metal sheeting is initially subjected to heat treating in step (a.1) with said gas in contact therewith wherein the initial temperature of said gas is a temperature at about room temperature between about 20° C. and 30° C.

29. The cell of claim 27 wherein said metal sheeting comprising said copper layer is subjected to heat treating after said anode casing is formed but before said anode material is inserted therein.

30. The cell of claim 27 wherein said cathode is a catalytic cathode comprising $MnO_2$.

* * * * *